Oct. 28, 1941.  S. W. SHAW  2,260,344
TRACTOR
Filed April 18, 1939  5 Sheets-Sheet 1
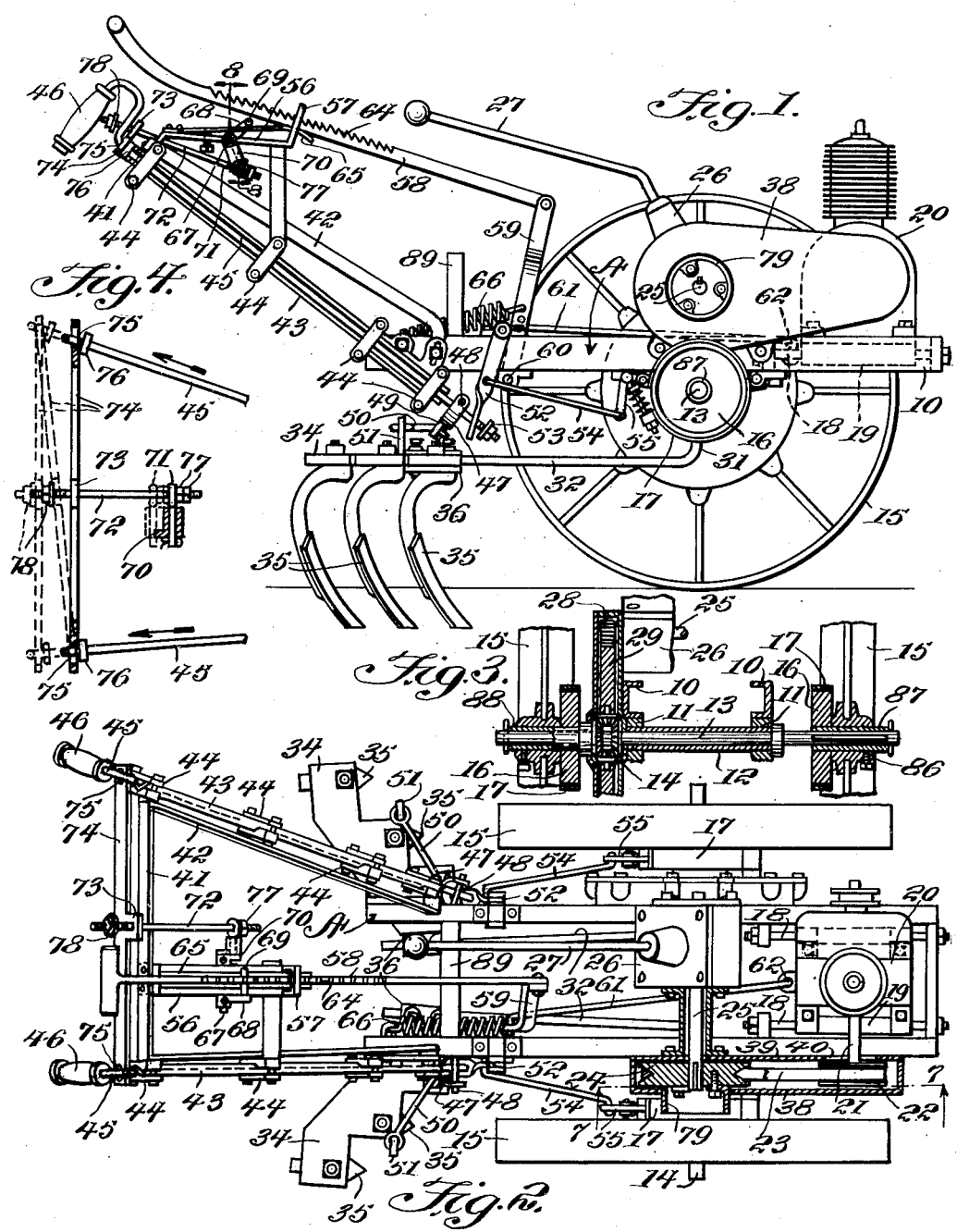
Stanley W. Shaw
INVENTOR
BY Victor J. Evans & Co.
ATTORNEYS
WITNESS J. T. L. Wright Oct. 28, 1941. S. W. SHAW 2,260,344
TRACTOR
Filed April 18, 1939 5 Sheets-Sheet 2
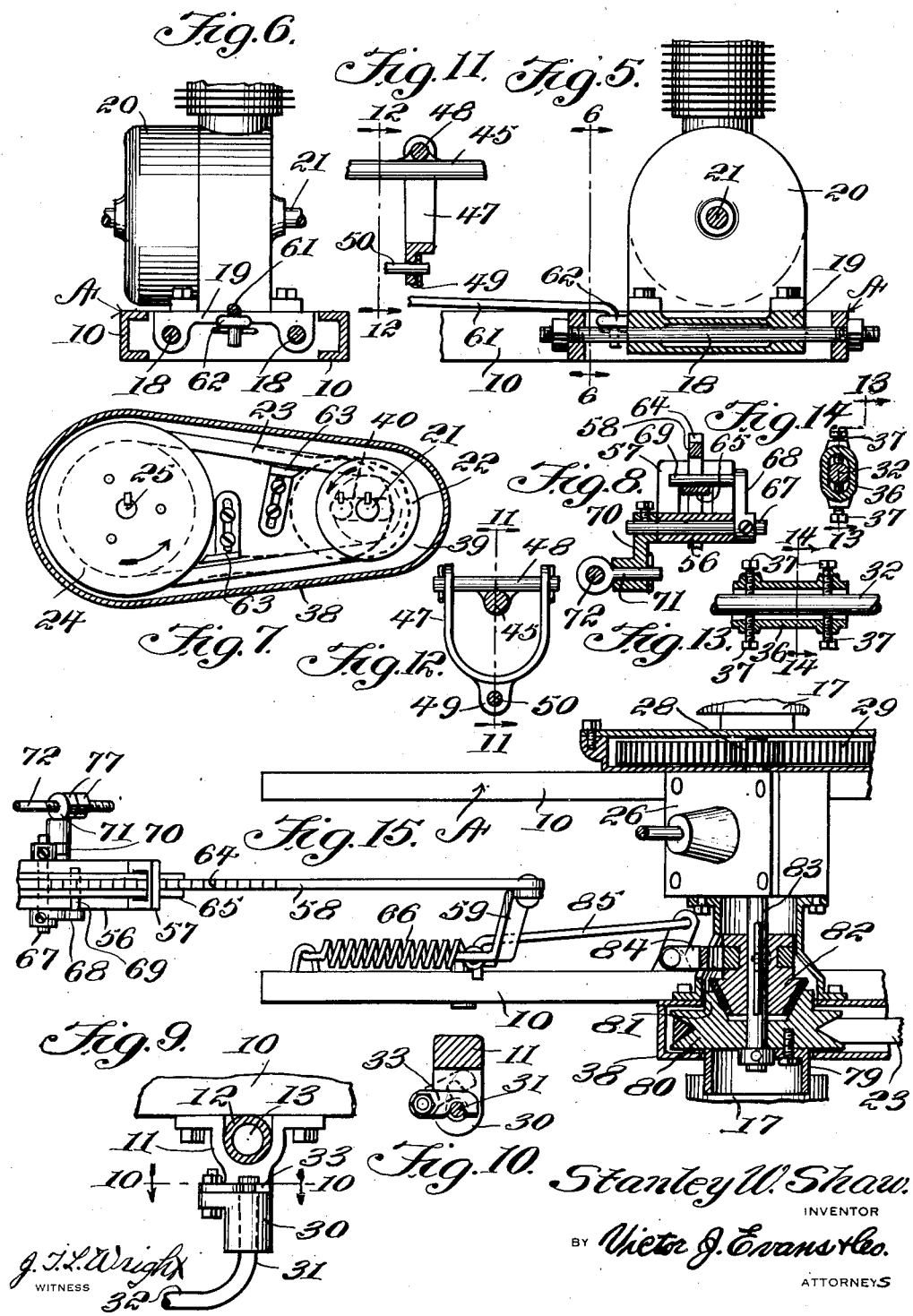
Stanley W. Shaw, INVENTOR
BY Victor J. Evans & Co.
ATTORNEYS

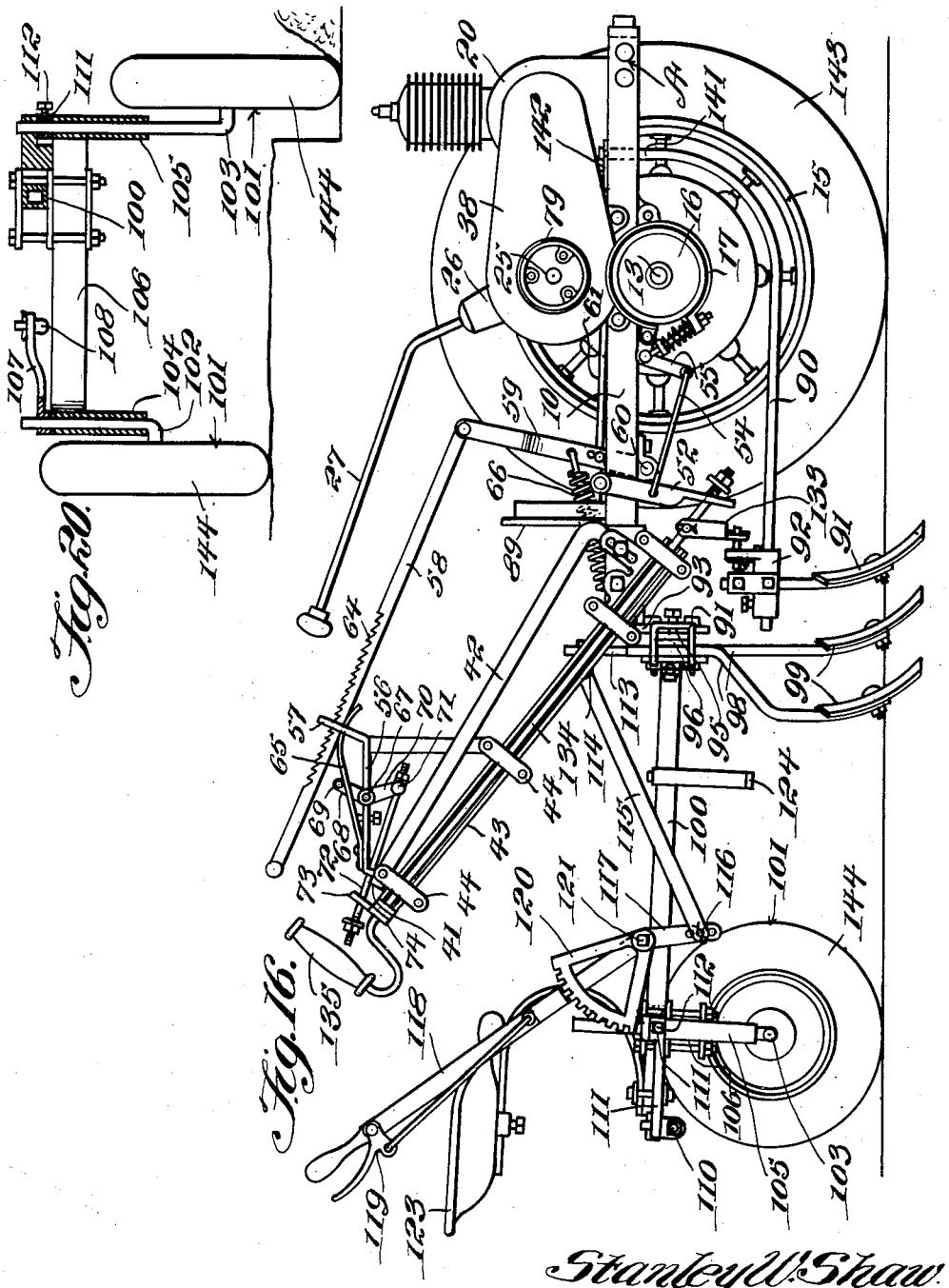

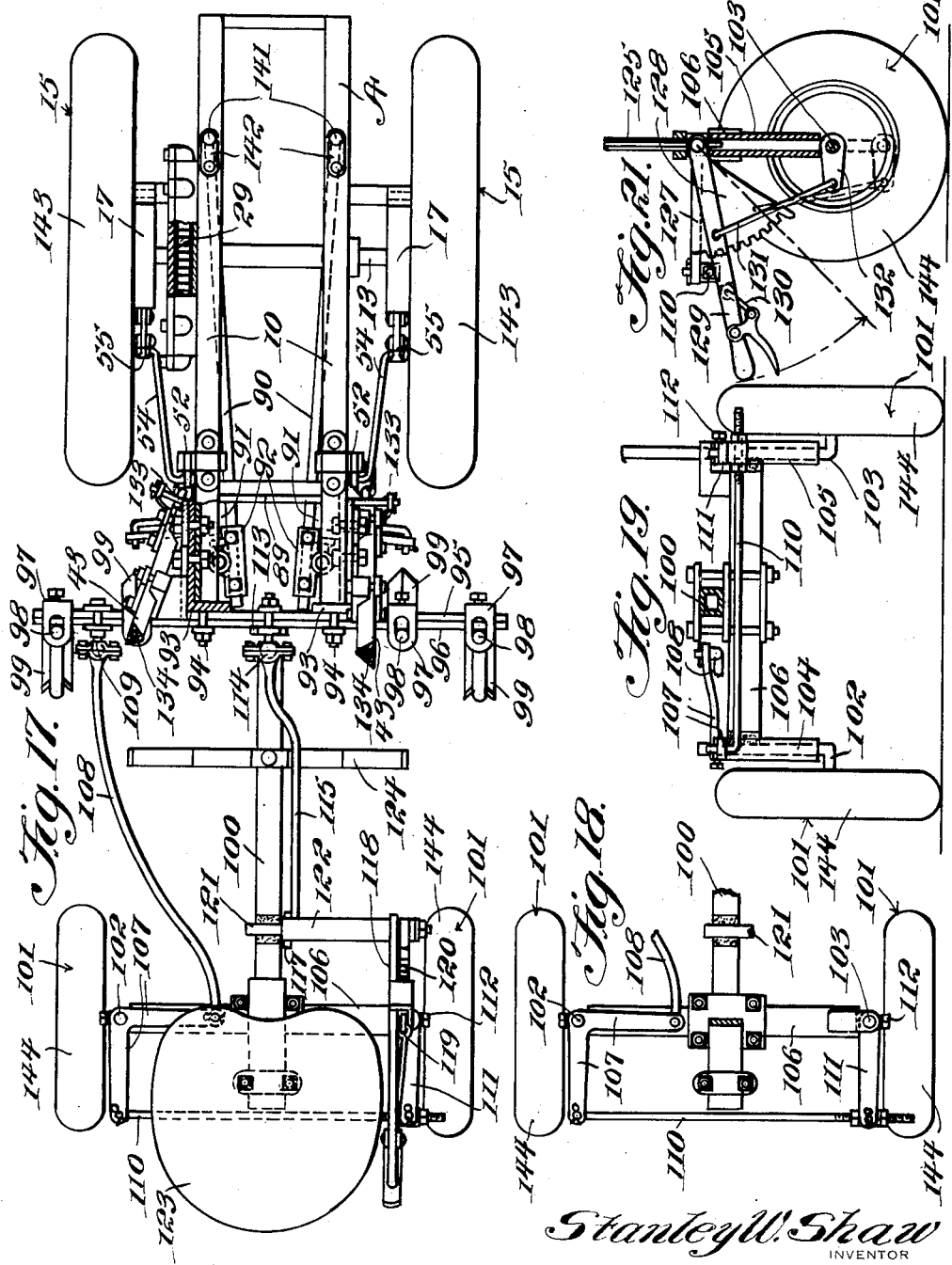

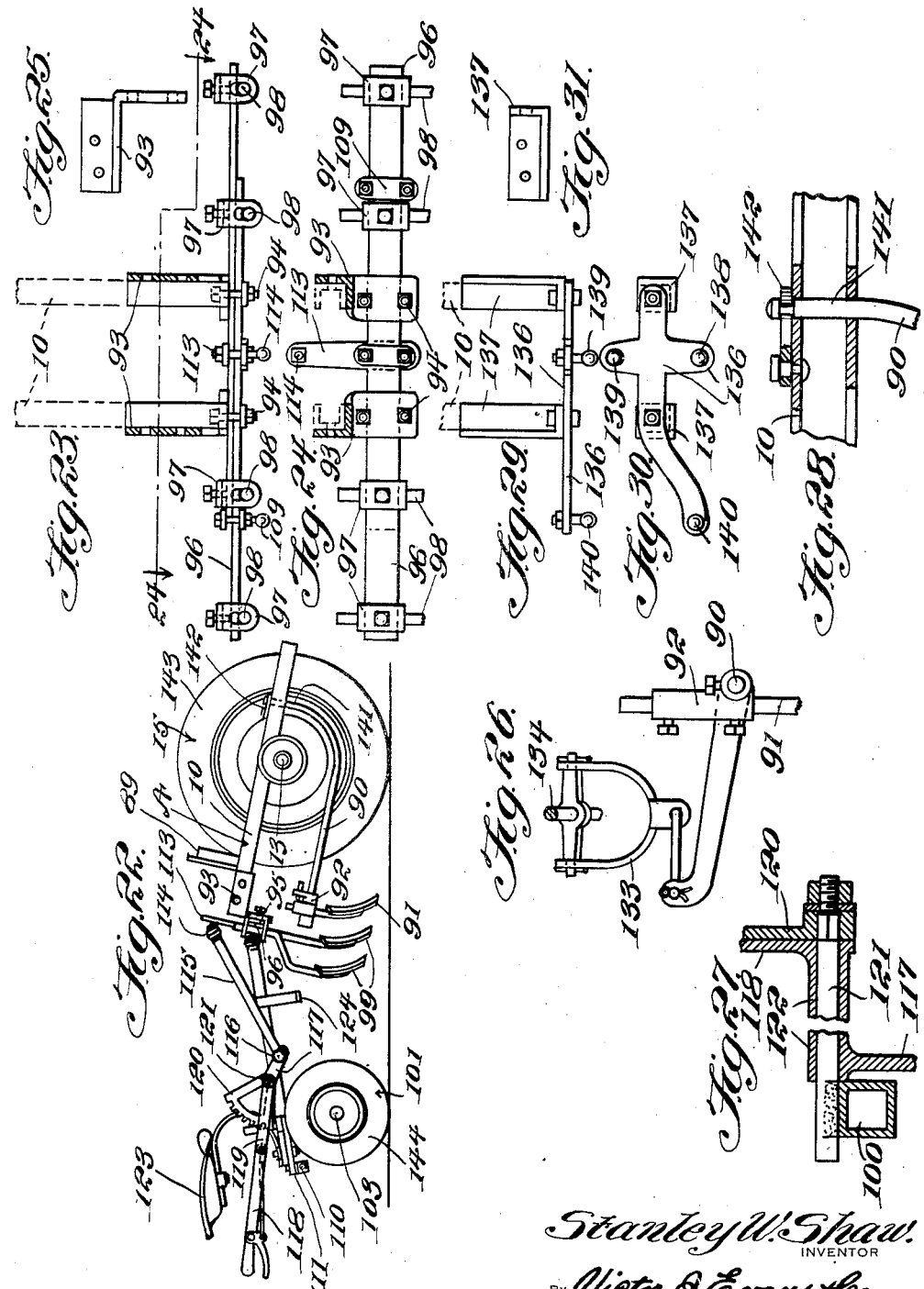

Patented Oct. 28, 1941

2,260,344

UNITED STATES PATENT OFFICE 2,260,344

TRACTOR

Stanley W. Shaw, Galesburg, Kans.

Application April 18, 1939, Serial No. 268,629

8 Claims. (Cl. 180—17)

The invention relates to tractors and more especially to motor powered wheel tractors for farming purposes.

The primary object of the invention is the provision of a tractor of this character, wherein it is susceptible of turning by its own power without any physical effort on the part of the operator and also the power can be shut off from the ground wheels thus enabling the stopping of the tractor at will.

Another object of the invention is the provision of a tractor of this character, wherein the controls for the the application of the brakes and the shutting off of the power are of novel construction and unique in assembly, being hand regulated so that the tractor in the operation thereof is under the command of the operator.

A further object of the invention is the provision of a tractor of this character, wherein the turning action when completing a row in the cultivation of the ground or growing plants, is had under the motive power of such tractor, thus an operator is relieved from any duty of a physical nature except in the guiding of the tractor or when making a turn in either direction.

A still further object of the invention is the provision of a tractor of this character, wherein a riding attachment is a part of the equipment of the tractor so that when the latter is used for cultivating purposes the operator of the machine can ride the same and also the controls of such tractor are convenient to the operator when riding said tractor.

A still further object of the invention is the provision of a tractor of this character, wherein the riding attachment is susceptible of adjustment to regulate the travel thereof in a furrow, when the said tractor is active for plowing or ditching purposes, and the rider sustained in a non-tilting position, the riding attachment being susceptible of concurrent turning with the tractor and is guided by the latter.

A still further object of the invention is the provision of a tractor of this character, which is comparatively simple in its construction, thoroughly reliably and efficient in operation, readily and easily handled, strong, durable, novel in its entirety and comparatively inexpensive to manufacture.

With these and other objects in view, the invention consists in the features of construction, combination and arrangement of parts as will be hereinafter more fully described, illustrated in the accompanying drawings, which disclose the preferred and modified forms of embodiment of the invention and pointed out in the claims hereunto appended.

In the accompanying drawings:

Figure 1 is a side elevation of a tractor constructed in accordance with the invention.

Figure 2 is a top plan view thereof, portions being in section.

Figure 3 is a fragmentary vertical transverse sectional view through the differential of the tractor.

Figure 4 is a fragmentary top plan view partly in section showing diagrammatically the controls for the brakes and the power unit.

Figure 5 is a fragmentary vertical longitudinal sectional view showing the slide mounting of the motor.

Figure 6 is a sectional view on the line 6—6 of Figure 5.

Figure 7 is a sectional view on the line 7—7 of Figure 2.

Figure 8 is a sectional view on the line 8—8 of Figure 1.

Figure 9 is a fragmentary vertical sectional view showing in side elevation the pivotal support of one of the cultivator bars or beams.

Figure 10 is a sectional view on the line 10—10 of Figure 9.

Figure 11 is a sectional view on the line 11—11 of Figure 12.

Figure 12 is a sectional view on the line 12—12 of Figure 11.

Figure 13 is a sectional view on the line 13—13 of Figure 14.

Figure 14 is a sectional view on the line 14—14 of Figure 13.

Figure 15 is a fragmentary plan view partly in section showing a modification involving a cone clutch.

Figure 16 is a side elevation of the tractor with the riding attachment and involving a modification.

Figure 17 is a top plan view thereof partly in section.

Figure 18 is a fragmentary horizontal sectional view taken through the riding attachment.

Figure 19 is a vertical transverse sectional view taken through the riding attachment.

Figure 20 is a view similar to Figure 19 showing one of the ground wheels adjusted for traveling in a furrow.

Figure 21 is a fragmentary vertical sectional view showing a slight modification of the rider attachment.

Figure 22 is a fragmentary side elevation embodying the modified form of riding attachment and in an adjusted position for clearing the ground working tools from the ground.

Figure 23 is a fragmentary top plan view partly in section showing the adjustable hanger for the ground working tools of the tractor in its modified form as shown in Figure 16.

Figure 24 is a sectional view taken on the line 24—24 of Figure 23.

Figure 25 is a detailed side elevation of one of the brackets for the tool hanger shown in Figures 23 and 24.

Figure 26 is a fragmentary detailed elevation showing adjuncts of one of the controls of the tractor.

Figure 27 is a fragmentary sectional view thereof.

Figure 28 is a fragmentary side elevation partly broken away of the tractor frame showing a modified form of the coupling of one of the cultivator bars or beams.

Figure 29 is a fragmentary top plan view showing a modified form of hanger in substitute for the hanger shown in Figures 23 and 24.

Figure 30 is an elevation thereof.

Figure 31 is a side elevation of a bracket for the hanger in Figures 29 and 30.

Similar reference characters indicate corresponding parts throughout the several views in the drawings.

Referring to the drawings in detail, particularly Figures 1 to 15, inclusive, the tractor or machine comprises a main frame A having spaced parallel side sills 10, being longitudinally of the tractor or machine at the under sides of these sills are the bearings, one being indicated at 11 for the housing 12 of a wheel axle unit 13 involving a differential 14. The axle unit 13 supports the ground wheels 15. The wheels 15 have associated therewith brake drums 16 embraced by brake bands 17 of the expansible and contractible standard kind.

Arranged between the side sills 10 of the frame A forwardly of the latter are spaced, parallel rod tracks 18 on which is slidably fitted a carrier 19 having fixedly mounted thereon an internal combustion motor 20, which is the power unit for the tractor or machine. The unit has its power shaft 21 fitted with the pulley 22 over which is trained an endless driving belt 23 being also trained over a driven pulley 24 fixed to a transmission shaft 25 involving transmission gearing (not shown) and confined within a transmission housing 26. The transmission shift lever is indicated at 27 for regulating the speed of driving operation and reversal of the traveling direction of the tractor or machine. The transmission mechanism has connection by a pinion 28 with a master gear 29 of the differential 14 and in this manner the wheels 15 are driven.

On each bearing 11 is built a pivotal sleeve 30 for the end 31 of a cultivator beam or bar 32. This sleeve has pivoted thereto a releasing latch 33 engageable with the pivot end 31 for the detachable fitting of the bar or beam 32 to said bearing 11. Each cultivator beam or bar 32 carries a bracket 34 to which fit the ground working elements 35. The bracket 34 is formed with an elongated, substantially oval shaped sleeve 36 accommodating the beam or bar 32 and has fitted therein upper and lower set screws 37, these engaging with the bar or beam 32 for adjustably fastening the bracket 34 thereon.

The pulleys 22 and 24 and the belt 23 thereover are confined within a shield casing 38 suitably made secure in place, the inner wall 39 of this casing being slotted at 40 to provide a clearance for the power shaft 21 of the motor 20 when the carrier 19 is shifted on the rod tracks 18 for a purpose presently described.

At the rear end of the frame A and suitably fixed to the side sills 10 is a forwardly inclined handle bar guide frame 41. Its side members 42 are associated with angle irons 43, the frame 41 being a support therefor. Rotatably mounted in these angle irons 43 through the medium of cleats 44 are rods 45 having rearwardly inclined upper end crank handles or grips 46 while fixed to these rods 45 next to the lower ends in straddling relation thereto are detachable yokes 47. Each yoke 47 is pivoted to a pin 48 and is formed with a medial eye 49 in which is loosely fitted a link 50. These links 50 are loosely connected at 51 to the brackets 34 and on the rotating of the rods 45 the cultivator beams or bars 32 can be laterally adjusted to vary the relationship of the ground working elements at opposite sides of the tractor with respect to each other. The rods 45 are slidable in angle irons 43 in addition to the rotatable mounting thereof.

Pivotally supported at opposite sides of the frame A are swinging arms 52 which loosely engage the lower ends of the rods 45, each being fitted with an abutment 53 for action upon the arms 52 next thereto. The arms 52 have connected therewith links 54 engaged with brake band operating levers 55. Thus on the shifting of one of the rods 55 one brake band 17 will be operated and simultaneously on the shifting of the other rod the other brake band 17 will be operated. By shifting both rods 45 the two brake bands 17 will be operated simultaneously. In this manner by operating one of the brake bands 17 the tractor will be caused to pivot under its own power for turning movement then by operating both brake bands simultaneously the speed of forward travel through braking action may be had of the tractor.

Connected with the frame 41 is a support 56 having a guide eye-like keeper 57 through which works a shift lever 58 having connection with a rocking arm 59 swingingly pivoted at 60 to the frame A and to which is connected a throw link 61, the same being also connected at 62 to the carrier 19. This lever 58 when shifted moves the carrier 19. On movement of the carrier in one direction the belt 23 will be slackened about the pulleys 22 and 24 to shut off power from the motor 20 to the wheels 15. To eliminate the sticking of the belt 23 to the pulley 22, there is provided in the shield casing 38 adjustable guides 63, these being adapted to act upon the belt on the slackening thereof to raise the latter out of the belt grooves in the pulleys 22 and 24 and thus eliminating the sticking of the belt therein.

The lever 58 is formed with a toothed rack 64 to enable adjustable latching of this lever by the keeper 57, the lever being acted upon by a leaf spring 65 urging the toothed rack into latching engagement with the said keeper 57. Connected with the arm 59 is a coiled retractile spring 66, being also connected with the frame A. The purpose of this spring is to have the carrier 19 shift when the lever 58 is released from the keeper 57 for the slackening of the belt 23 and thus cutting off drive from the motor 20 to the wheels 15 of the tractor.

On the support crosswise thereof is a turnable stud shaft or arbor 67 to which is fixed an arm 68 carrying a retractor pin 69 overlying the leaf spring 65 for depressing it away from the lever 58 which is urged thereby into latching engagement with the keeper 57. This stud shaft 67 also has fixed thereto a crank 70 in which is swiveled an eye 71 through which plays a coupling rod 72. The rod is engaged in the ear 73 formed on a cross connecting bar 74 loosely engaged at 75 with the said rods 45 and resting against abutments 76 upon these rods. Thus when one rod 45 is longitudinally shifted with respect to the angle iron 43 the bar 74 will be rocked. This rocking action will be ineffective on the pin 69 for depressing the spring 65. However, when both slidable rods 45 are longitudinally shifted in the angle irons 43 together the bar 74 will recede or move therewith, actuating the pin 69 for depressing the spring 65 and thus the lever 58 will become unlatched at the rack 64 from the keeper 57. Concurrently the spring 66 becomes active for the shifting of the carrier 19 with the motor 20 thereon and in this way slackening the belt 23. Should it become necessary, the lever 58 can be manually pulled when it is released from the keeper 57 for the shifting of the carrier 19 and thereby power will be shut off from the wheels 15 of the tractor. Each rod 45 is turned by the handle 46 and also longitudinally shifted in the angle bar 43 manually as common thereto. Thus each brake band 17 can be applied separately or together and also when both brake bands are applied for braking action through the shifting of the rods 45 the power from the motor 20 will be cut off from the wheels 15.

The coupling rod 72 carries the adjustable nuts 77 and 78, respectively, the nut 78 being next to the ear 73 while the nut 77 is next to the eye 71.

The pulley 24 at its outer side carries a belt pulley 79 so that power can be taken off to outside machinery from this driven pulley 24.

In Figure 15 of the drawings there is shown a slight modification wherein the driven pulley 80 is formed with a female clutch part 81 co-acting with a male cone clutch part 82 splined or keyed on the transmission shaft 83, the male clutch part 82 being shifted by a throw yoke 84 operated from the link 85 in substitute for the link 54. The clutch parts 81 and 82 coacting with each other enable the clutching and unclutching operations between the power connections of the motor 20 and the wheels 15 of the tractor.

In Figure 3 of the drawings one of the wheels 15 has its hub 86 fixed to a sleeve 87 splined to one section of the axle while the other wheel is fixed to a sleeve 88 loose on the other section of the said axle. The brake drum 16 is fixed to the sleeve 87 of one wheel while the other brake drum is on the sleeve 88, thus it being seen from this figure of the drawings that either wheel may be independently braked. The brake bands 17 on the drums 16 are controlled individually or jointly in the application of the brakes. Thus through the use of independent braking action the tractor can be pivoted under its own power for turning either to the right or to the left or completely around.

At the rear end of the frame A between the sills 10 is an upwardly arched yoke piece 89 for bracing purposes.

In Figures 16 to 31, inclusive, of the drawings there are shown modifications of the tractor in that the bars or beams 90 are carried by the main frame for pivotal swing in a lateral direction and each of these bars or beams has adjustably fitted thereto a ground opener blade or tool 91, being adjustable at 92. The frame A of the said tractor at its rear end, that is, attached to the side sills 10, has brackets 93, these having detachably fitted therewith by fasteners 94 relatively movable ground working tool hangers in the form of overlapped bars 95 and 96, respectively. These bars through clamps 97 fasten the stems 98 of the ground working tools 99 thereto, being vertically and horizontally adjustable through the medium of the said clamps 97 for proper positioning for the working thereof.

At the longitudinal center of the tractor main frame A between the side sills 10 is detachably and flexibly mounted the forward end of the draft pole 100 of a riding attachment or sulky including ground wheels 101 journaled upon turnable axles 102 and 103, respectively. Their turning stems are of different lengths and the shorter of these is rotatably supported in a vertical bearing 104 while the longer of the stems is journaled in the vertical bearing 105, there being a cross sill 106 between these bearings, which are a part thereof. The shorter stem of the axle 102 is fitted with a bell crank lever 107, one of its arms having pivotally connected thereto a steering rod 108 which also has universal connection or coupling at 109 with the hanger for the ground working tools 99 to one side of the longitudinal axis of the tractor. The other arm of the bell crank lever 107 has pivotal connection with a tie rod 110 adjustably connected with a crank arm 111 slidably connected with the longer stem of the axle 103. In this manner the wheels 101 can be trued for correct trackage and also such wheels simultaneously turned for the steering of the riding sulky in its association with the tractor. This crank arm 111 is connected with the stem of the axle 103 so that the said stem can be vertically shifted in the bearing 105 therefor without simultaneous movement of the said arm yet the arm turns the said axle. The arm 111 carries a set screw 112 for the adjustable fastening thereof to the stem of the axle 103. The stem of the axle 103 is susceptible of vertical adjustment in its bearing 105 so as to raise or lower the wheel 101 carried by said axle 103 relative to the wheel 101 carried by the axle 102 to avoid lateral tilting of the riding sulky when the wheel 101 on the axle 103 travels in a furrow on the working of the tractor.

Mounted at the longitudinal center of the tractor on the hanger having the bars 95 and 96 is a clevis 113 with which is associated a universal coupling joint 114 for a raising and lowering rod 115 which is adjustably pivoted at 116 to an extension 117 of a throw lever 118 equipped with a hand release, spring thrown, latching device 119 engageable with a rack keeper segment 120 fixed to an attaching pin 121. The lever 118 is pivoted at 122 to this pin 121 for swinging movement. The lever 118 is for the purpose of imparting tilting relationship between the tractor and the riding sulky for bringing the ground working tools 91 and 99 into engagement with the ground or clear of the same, the cleared position thereof being shown in Figure 22 of the drawings. This lever 118 is manually operated by the rider of the sulky or an operator of the machine.

The sulky is equipped with a seat 123 for occupancy and its pole 100 has a foot rest 124 for the feet of the occupant of the seat.

In Figure 21 of the drawings there is shown a modification for the adjustment of the ground wheel 101 on the axle 103 of the sulky wherein the stem 125 of the axle 103 for this wheel 101 has splined or keyed thereto the crank arm 127, a substitute for the arm 111 and this arm 127 is susceptible of swing but is held against raising and lowering movement on the vertical adjustment of the stem 125. Fixed against vertical movement, preferably united with the arm 111, is a rack keeper segment 128 for a throw lever 129 equipped with a hand released, spring thrown, latching device 130 coacting with the keeper segment 128 and this lever 129 through the link 131 has connection at 132 with the axle 103 so that on the throwing of the lever 129 by hand the axle 103 can be raised and lowered for changing the relationship of the wheel 101 with respect to the other wheel on the axle 102. This change is desirable when the sulky is traveling with one of its wheels within a furrow, as before mentioned, thus relieving side tilting of the sulky in this instance.

The bar or beam 90 has operating connections at 133 with a rod 134 corresponding to the rods 45 excepting that the turning handles of the grips 135 are reversed to those grips 46 of the said rods 45 for convenience in operation when the sulky is occupied by a rider or operator.

In Figures 29 and 30 and 31 of the drawings there is shown a further modification wherein a hanger 136 is substituted for the hanger involving the bars 95 and 96 and this hanger 136 is fastened to the sills 10 of the tractor by brackets 137. The hanger 136 has coupling at 138 with the pole 100 and also coupling 139 with the raising and lowering rod 115 while the coupling 140 has connection with the steering rod 108.

In Figure 28 of the drawings each sill 10 of the main frame of the tractor has a clearance for accommodating the pivot end 141 of each beam or bar for the ground working tools. This pivot end is detachably pivotally fastened at 142 in its pivotal fitting in the sill 10, being a substitute structure for that shown in Figures 9 and 10 of the drawings and involving the parts 30, 31, 32 and 33, respectively.

It should be apparent in the association of the riding sulky with the tractor that the said sulky is automatically guided or turned concurrently with the turning of the tractor. Further, one wheel of the sulky can travel in the open furrow and side tilting of the said sulky avoided.

Additionally, the tractor as well as the riding sulky, can be vertically raised and lowered together for clearing of the ground working tools from the ground or the bringing of the same into working position.

The wheels of the tractor in the modified form thereof are rubber tired at 143 and similarly the sulky wheels 101 are rubber tired at 144.

As heretofore indicated, each cultivator beam or bar 90 in the modified form of construction illustrated in Figures 16, 26 and 27 of the drawings carries a single tool 91 so that there will be only one tool on each side of the tractor which makes it much easier to handle than if all the ground digging tools were carried by these beams 90 and the latter operated from the rods 134, it being apparent from Figures 1 and 3 of the drawings that the beams or bars 32 support gangs of tools or clusters thereof and these bars are laterally adjusted through the rods 45 from the hand grips 46. This type of control is disclosed in Patent No. 1,625,829, issued April 26, 1927.

What is claimed is:

1. In a tractor, a wheeled frame, a power unit on said frame and having driving connections with the wheels of said frame, brakes for the respective wheels of said frame and operative together or independently of each other, hand actuated members carried at the rear of said frame and controlling the respective brakes for operation thereof together or independently of each other, and means cooperating with said members for interrupting the connections between the power unit and said wheels when the brakes are applied simultaneously with each other.

2. In a wheeled tractor, a power unit for operating the wheels of said tractor, means for braking independently the said wheels, hand controlled means for operating the braking means, and means for disrupting the connections between the power unit and said wheels and operated by the last-named means on braking the wheels simultaneously with each other.

3. In a wheeled tractor, a power unit for operating the wheels of said tractor, a separate brake for each wheel, a hand controlled means for each brake, means for disrupting the connection between the power unit and said wheels, and means operated by the simultaneous operation of the hand controlled brake operating means for operating the means for disrupting the connection between the power unit and said wheels.

4. In a wheeled tractor, a power unit for operating the wheels of said tractor, a separate brake for each wheel, a hand controlled means for each brake, a locked lever for controlling the connection between the power unit and said wheels, and means operated by the simultaneous operation of the hand controlled brake operating means for releasing the locked lever controlling the connection between the power unit and said wheels to allow the power unit to be automatically disconnected from the wheels.

5. In a wheeled tractor, a power unit for operating the wheels of said tractor, means for normally holding the power unit disconnected from the wheel operating means, a separate brake for each wheel, a hand controlled means for each brake, a locked lever for normally holding the power unit operating means connected to the wheels, and means operated by the simultaneous operation of the hand controlled brake operating means for releasing the locked lever for disconnecting the power unit operating means from the wheels.

6. In a wheeled tractor, a power unit for operating the wheels of said tractor, means for normally holding the power unit disconnected from the wheel operating means, a hand operated locked lever for controlling the connection between the power unit and said wheels, a separate brake for each wheel, a separate hand controlled means for each brake, and means operated by the simultaneous operation of the hand controlled brake operating means for releasing the locked lever controlling the connection between the power unit and said wheels to allow the power unit to be automatically disconnected from the wheels.

7. In a wheeled tractor, a horizontally movable power unit on said tractor, a belt driven by the power unit for operating the wheels, a hand operated means for moving the power unit to tighten the belt for driving the wheels, means for locking the said hand operated means with the belt tight, a separate brake for each wheel, a hand controlled means for each brake, and means operated by the simultaneous operation of the hand controlled brake operating means for releasing the locked hand operated means, whereby the power unit may move horizontally for loosening the belt to discontinue the drive of the tractor.

8. In a wheeled tractor, a horizontally movable power unit on said tractor, a belt driven by the power unit for operating the wheels, a differential connection between the wheels, a hand operated means for moving the power unit to tighten the belt for driving the wheels, means for locking the said hand operated means with the belt tight, a separate brake for each wheel, a separate hand controlled means for each brake, and a pivoted member operated by the simultaneous operation of the hand controlled brake operating means for releasing the hand operated means, whereby the power unit may move horizontally for loosening the belt to discontinue the drive of the tractor.

STANLEY W. SHAW.